Nov. 5, 1974  Q. A. CAPPELLI  3,846,199
ARTIFICIAL EYE AND METHOD OF CONSTRUCTION
Original Filed June 3, 1971
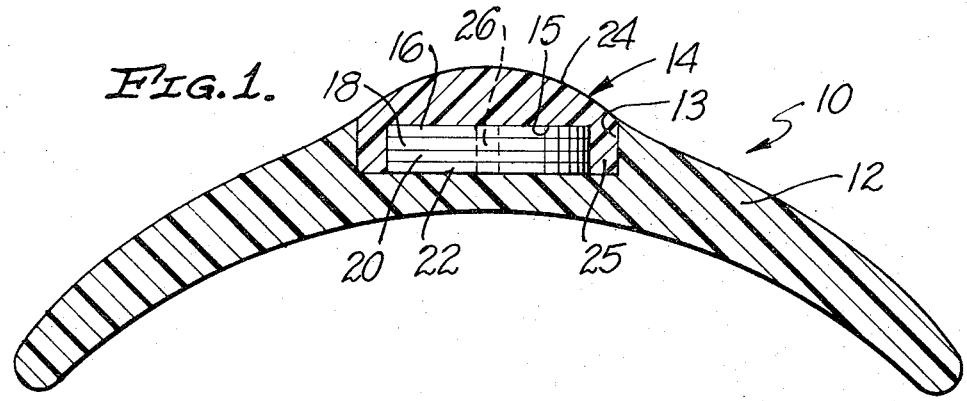
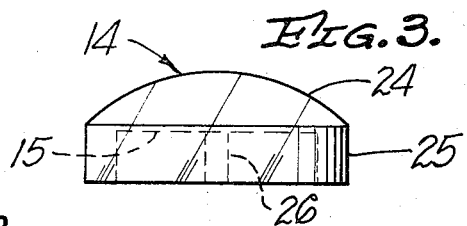
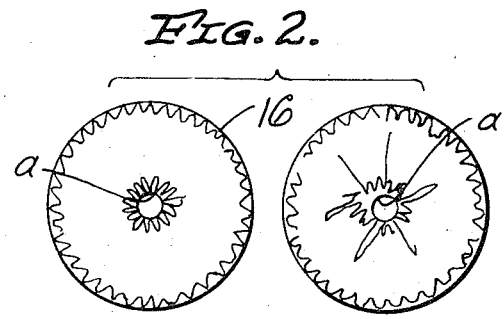
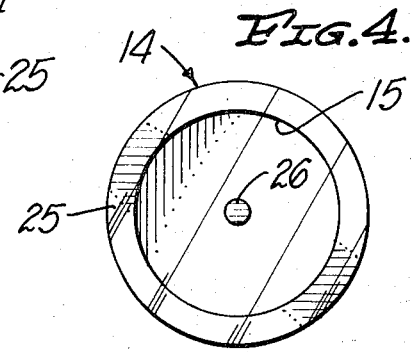
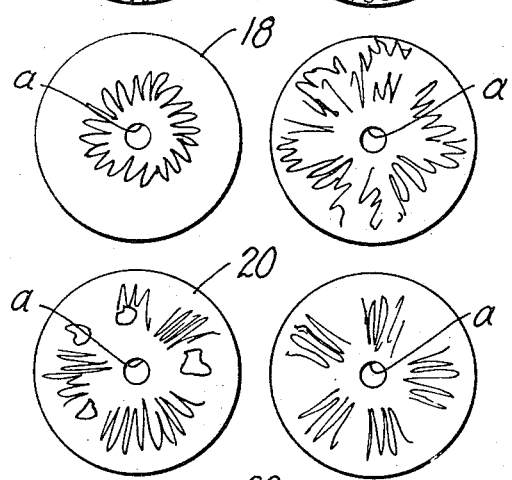
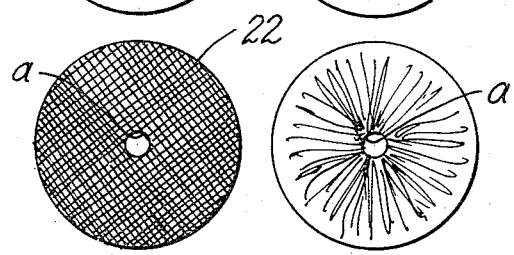
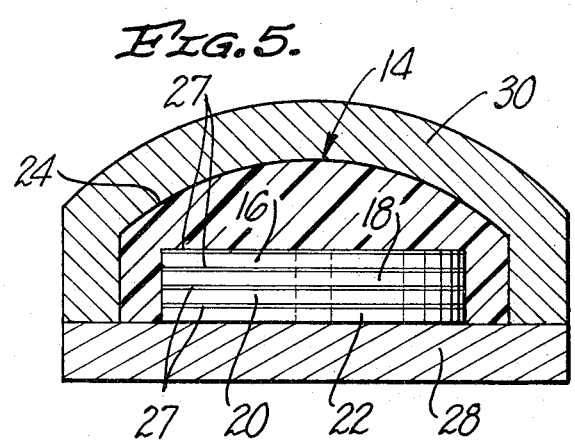
INVENTOR
QUIDO A. CAPPELLI
BY HIS ATTORNEYS
HARRIS, KIECH, RUSSELL & KERN

United States Patent Office 3,846,199
Patented Nov. 5, 1974

3,846,199
ARTIFICIAL EYE AND METHOD OF
CONSTRUCTION
Quido A. Cappelli, Bronx, Calif., assignor to Danker & Wohlk, Inc., Uniondale, N.Y.
Original application June 3, 1971, Ser. No. 149,535, now abandoned. Divided and this application Oct. 25, 1972, Ser. No. 300,570
Int. Cl. B44d 5/06
U.S. Cl. 156—61         1 Claim

ABSTRACT OF THE DISCLOSURE

An artificial eye formed by selecting a plurality of prepainted transparent plastic discs, covering the upper surfaces of the discs with a liquid having an index of refraction corresponding to the plastic, stacking the discs in a preselected order and viewing the stack through a transparent dome to check the appearance of the cornea and iris formed thereby prior to fusing the discs together in the bottom cavity of a transparent plastic dome and casting the dome in the top of a sclera-shaped plastic base.

---

This is a division of application Ser. No. 149,535, filed June 3, 1971, now abandoned.

DISCLOSURE

The present invention relates to improvements in artificial eyes and more particularly to a new artificial eye structure and method of construction.

While many methods of constructing artificial eyes are in use today, they all have a common feature, namely, the use of a clear plastic dome above a flat painted surface simulating the iris of an eye. This feature is essential to the production of a visual depth effect for the cornea and iris of the artificial eye.

Possibly, the most popular method of forming artificial eyes of high quality and depth effect is a "cut-and-try" method. In that method, the top of a small plastic disc is hand-painted by an artist to depict the basic coloring and configuration of the iris of an eye it is desired to match, for example, the iris of a patient's good eye. Once painted, the top of the disc is covered with a "monomer-polymer dough," that is, an acrylic monomer, methylmethacrylate to which has been added ground polymethylmethacrylate granules. The monomer-polymer dough in its uncured state is formed with a concave mold above the disc. The dough is then cured and fused to the disc by applying heat and pressure to the mold and disc. The resultant dome-shaped article is known as a "button." Once the button is formed, the artist visually checks the configuration and color of the simulated iris by looking through the top of the button and comparing the simulated iris with the patient's good eye. If he is satisfied with the basic coloring and configuration, the artist removes the top part of the button, as by grinding, leaving about .20 to .25 millimeters thickness of plastic above the top of the original disc. The artist then paints on top of the truncated button, adding to the configuration and coloring of the simulated iris. Following the previously outlined method, he next forms a new dome-shaped button using the truncated button as a base. Having formed a new button, the artist then again visually compares the simulated iris with the patient's good eye. The foregoing process of grinding, painting, button forming, and visual comparing is repeated as many times as desired but usually three or four time. The resulting button closely simulates the cornea and iris of the patient's good eye both as to color and visual configuration. In addition, a superior depth effect is created for the simulated cornea and iris by the spaces between the painted layers of the button.

While the "cut-and-try" method produces a high quality artificial cornea and iris for casting in a sclera-shaped plastic base of an artificial eye, the process is quite time-consuming and expensive. Each curing time for the button is about two hours. This necessitates a separate visit for the patient at each of the three or four painting and visual inspection sessions in the process of forming a finished button.

Accordingly, it is an object of the present invention to provide an improved artificial eye structure capable of exactly matching a patient's good eye and possessing a superior and highly realistic depth effect for the cornea and iris thereof.

Another object of the present invention is to provide an artificial eye structure of the foregoing character which may be constructed upon a single visit of the patient.

A further object of the present invention is to provide a method of constructing artificial eyes which does not require repeated painting and grinding or cutting of dome-shaped buttons to produce artificial eyes of the foregoing character.

Another object of the present invention is to provide a method of manufacturing artificial eyes of the foregoing character, including the steps of selecting a plurality of prepainted transparent plastic discs, covering the upper surfaces of the disc with a liquid having an index of refraction corresponding to the plastic, stacking the discs in a preselected order, and viewing the stack through a transparent dome to check the appearance of the cornea and iris formed thereby prior to fusing the discs together in the bottom cavity of a transparent plastic dome and casting of the dome in the top of a sclera-shaped plastic base.

The foregoing as well as other objects and advantages of the present invention may be more clearly understood by reference to the following detailed description when considered with the drawing which by way of example only illustrates a preferred form of artificial eye, the components thereof, and various of the steps in the formation of the artificial eye.

In the drawing:

FIG. 1 is a cross sectional view of one form of the artificial eye;

FIG. 2 is a top view of various forms of prepainted transparent plastic discs which may be selected for use in the artificial eye;

FIG. 3 is a side view of one form of transparent plastic dome included in the artificial eye;

FIG. 4 is a bottom view of a dome shown in FIG. 3; and

FIG. 5 is an enlarged diagrammatic cross sectional view of the mold for fusing the discs and dome into a finished button by simultaneous application of heat and pressure.

In FIG. 1, the illustrated form of the artificial eye is represented generally by the numeral 10 and comprises a sclera-shaped base 12 having a centrally located top cavity 13 receiving and tightly holding a transparent dome 14. The dome 14 includes a bottom cavity 15 holding a stack of prepainted transparent discs 16, 18, 20, and 22. The dome and discs simulate the cornea and iris of an eye while the base 12 simulates the sclera.

More particularly, the base 12 is formed of a clear plastic material, preferably a polymethylmethacrylate and is shaped like the sclera of the eye. In this regard, the base is generally arcuate being asymmetrical and generally similar in all meridians. A small amount of a pigment may be added to the polymethylmethacrylate during formation to give the base 12 a coloration corresponding to a sclera.

The dome 14 is preferably formed of a monomer-polymer dough having a convex top 24 and a substantially vertical annular side wall 25 defining the cylindrical bottom cavity 15. In addition, the dome includes a relatively narrow cylindrical protrusion 26 extending from the base of the cavity 15.

As will be described hereinafter, the protrusion defines the pupil for the artificial eye 10.

The discs employed in the artificial eye 10 are formed of a clear plastic material and each is approximately one-half inch in diameter and about .20 millimeters thick. Each disc includes a small central aperture $a$, corresponding in diameter to the size of the pupil it is desired to simulate. In the artificial eye 10, the protrusion 26 extends through the apertures $a$ in the stack of discs 16, 18, 20, and 22 and when viewed through the dome 14, simulates the pupil of an eye.

A top surface of each disc is painted with a color and design corresponding to colors and designs commonly found in the iris of the human eye. Various designs of iris configurations are illustrated in FIG. 2 on the tops of a plurality of discs. The discs may be stacked in different combinations to form different iris configurations, colorings, and effects. It is by way of example only that discs 16, 18, 20, and 22 were selected from the illustrated group and combined in the artificial eye 10.

More particularly, to form the artificial eye 10 in accordance with the method of the present invention, the good eye that it is desired to match is first viewed. Then, a plurality of the prepainted transparent plastic discs are selected by a technician from an organized group, such as illustrated in FIG. 2. The discs are selected because of their color and iris configuration and because the technician believes that their combination will most closely match the iris of the good eye. For example, from the illustrated group, discs 16, 18, 20, and 22 are selected.

After selecting the discs, the top surface of each disc is coated with a layer 27 of any commercially available clear liquid having an index of refraction substantially corresponding to the plastic forming the disc, e.g., about 1.49. The discs are then stacked on top of each other with the apertures $a$ aligned, and viewed through a transparent plastic dome. The dome may be like 14 in which case, the discs are stacked in the bottom cavity 15 with the central aperatures receiving the protrusion 26.

During viewing, the simulated iris formed by the discs 16, 18, 20, and 22 is closely compared with the good eye. If the simulated iris matches the good iris, the method proceeds. If not, certain of the discs are replaced with other discs until the desired match is achieved. In some cases, it may be required that the technician add color to or alter the painted configuration on one or more of the discs in the stack to produce the desired match.

The liquid plays an important role in the visual matching of the simulated iris to the good iris. In particular, when discs of plastic are stacked on top of each other, very small air gaps are formed between adjacent discs. Air possesses a different index of refraction from the plastic. Thus, if the air gaps were allowed to exist in the stack of discs, incident light would be reflected at the surfaces of the disc and the colors and iris configuration viewed through the dome would be highly distorted. In the method of the present invention, the liquids on the upper surfaces of the discs fill the gaps between adjacent discs and between the top disc and the dome. Since the liquid possesses an index of refraction corresponding substantially to that of the plastic forming the discs, undesired reflection of incident light is materially reduced enabling the technician to view the true color and configuration of the simulated iris through the dome.

If the dome 14 has not already been constructed, once the proper match has been achieved, the dome is molded with the bottom cavity 15 shaped to closely receive the stack of discs and the protrusion 26 adapted to extend through the apertures $a$. In any event, the dome 14 with discs 16, 18, 20, and 22 stacked therein is mounted on a base 28 and placed in a concave mold 30. Heat and pressure are simultaneously applied through the mold and base to the dome and discs. For example, the mold may be subjected to a temperature of about 165° C. for three minutes under a strong spring pressure then allowed to cool to room temperature. The heat and pressure cause the discs and dome to fuse into a single unit or button simulating the cornea, pupil, and iris on the good eye. When the fusing has been completed, the finished button is removed from the mold for casing in the base 12.

In this regard, the finished button is placed on a quantity of monomer-polymer dough in a mold having concave bottom portions. Heat and pressure are applied to the mold to cure the dough and cast or fuse the button into the cavity 13 formed in the top of the resulting sclera-shaped base 12.

From the foregoing, it is appreciated that the method of the present invention allows a technician to rapidly and simply construct an artificial eye which will exactly match the good eye of the patient upon a single relatively short session with the patient. In addition, since the button simulating the cornea and iris of the pateint's good eye are formed in a series of vertically spaced layers, the resulting artificial eye 10 has a superior depth effect, at least matching the finest available on the market today.

While a particular form of artificial eye and method of construction have been described in some detail herein, changes and modifications may be made without departing from the spirit of the invention. Therefore, it is intended that the invention be limited in scope only by the terms of the following claim.

I claim:

1. A method of forming an artificial eye to match in color, configuration and depth effect a good eye of a patient comprising:

viewing the patient's good eye;

selecting from a group of transparent plastic discs a plurality of discs each having a top surface prepainted with a different color and design corresponding to colors and designs commonly found in the iris of the human eye, it being believed that an overlay combination of such selected discs will closely match the iris of the good eye in color, design configuration and depth effect;

covering said top surface of each selected disc with a liquid having an index of refraction substantially corresponding to the plastic material forming said disc;

stacking said discs one atop the other and viewing said stack of discs through the top of a transparent plastic dome to check the appearance of the iris formed by an overlay combination of said selected discs so that one or more of said discs may be replaced if necessary to produce the desired effect prior to a fusing of said discs;

simultaneously subjecting said discs to heat and pressure to fuse them together in and to a cavity in a bottom of a transparent plastic dome to simulate the cornea and iris of an eye; and casting said dome in the top of a sclera-shaped plastic base.

References Cited
UNITED STATES PATENTS

| | | | |
|---|---|---|---|
| 2,603,791 | 7/1952 | Jardon et al. | 3—13 |
| 2,603,792 | 7/1952 | Jardon et al. | 3—13 |
| 2,692,391 | 10/1954 | Gougelman | 3—13 |

EDWARD G. WHITBY, Primary Examiner

U.S. Cl. X.R.

3—13; 156—62, 293, 303.1